(12) United States Patent
Choi

(10) Patent No.: US 12,019,568 B2
(45) Date of Patent: Jun. 25, 2024

(54) SERIAL COMMUNICATION METHOD AND SYSTEM FOR MEMORY ACCESS

(71) Applicant: ELECTRONICS AND TELECOMMUNICATIONS RESEARCH INSTITUTE, Daejeon (KR)

(72) Inventor: Yongseok Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 113 days.

(21) Appl. No.: 17/518,823

(22) Filed: Nov. 4, 2021

(65) Prior Publication Data

US 2022/0318166 A1   Oct. 6, 2022

(30) Foreign Application Priority Data

Mar. 30, 2021 (KR) .......................... 10-2021-0041403

(51) Int. Cl.
| | | |
|---|---|---|
| *G06F 13/16* | (2006.01) | |
| *G06F 13/42* | (2006.01) | |
| *G06F 15/177* | (2006.01) | |
| *G06F 18/214* | (2023.01) | |

(52) U.S. Cl.
CPC ...... *G06F 13/1673* (2013.01); *G06F 13/1689* (2013.01); *G06F 13/4282* (2013.01); *G06F 15/177* (2013.01); *G06F 18/214* (2023.01)

(58) Field of Classification Search
CPC ............ G06F 13/1673; G06F 13/1689; G06F 13/4282; G06F 15/177; G06F 18/214
See application file for complete search history.

(56) References Cited

U.S. PATENT DOCUMENTS

| | | | |
|---|---|---|---|
| 6,188,699 B1 * | 2/2001 | Lang | ......................... H04L 9/40 370/458 |
| 7,649,795 B2 | 1/2010 | Kim et al. | |
| 8,073,040 B1 * | 12/2011 | Chan | ................... G06F 13/4072 375/216 |
| 8,335,956 B2 | 12/2012 | Tzannes | |
| 10,216,655 B2 | 2/2019 | Choi et al. | |
| 2005/0262184 A1 * | 11/2005 | Cherukuri | ........... G06F 13/4273 709/202 |

(Continued)

FOREIGN PATENT DOCUMENTS

| | | |
|---|---|---|
| KR | 10-2016-0025135 | 3/2016 |
| KR | 10-2018-0023543 | 3/2018 |

*Primary Examiner* — Eric T Oberly
(74) *Attorney, Agent, or Firm* — KILE PARK REED & HOUTTEMAN PLLC

(57) ABSTRACT

Provided are serial communication method and system for memory access. The serial communication system for memory access includes a processor-side processor that receives a memory transaction from a processor and converts the memory transaction into a packet according to a predetermined phase to serially transmit the packet; a memory-side processor that receives the serially transmitted packet according to the predetermined phase and converts the packet into the memory transaction to access a memory, wherein the predetermined phase includes a channel establishment phase, a flow control initialization phase, and a memory transaction phase.

20 Claims, 15 Drawing Sheets

(56) References Cited

U.S. PATENT DOCUMENTS

| | | | |
|---|---|---|---|
| 2006/0092842 A1* | 5/2006 | Beukema | H04L 47/10 |
| | | | 370/252 |
| 2012/0216084 A1* | 8/2012 | Chun | H04W 52/0209 |
| | | | 714/708 |
| 2013/0002396 A1* | 1/2013 | Sato | H04L 1/22 |
| | | | 340/2.1 |
| 2016/0065331 A1* | 3/2016 | Choi | G06F 13/4282 |
| | | | 714/748 |

* cited by examiner

FIG. 4

| 7 | 6 | 5 | 4 | | 2 | 1 | 0 | 15 | | 12 | 11 | | 8 |
|---|---|---|---|---|---|---|---|---|---|----|----|---|---|
| 0 | 0 | Ack | 000 ||| Channel Number |||| Lane Number |||
| Ch | Ts | | Reserved ||| [5:0] |||| [3:0] |||

FIG. 7

| 127 | | 0 |
|---|---|---|
| | Data Component | |

FIG. 8

| 31 | 0 |
|---|---|
| Cyclic Redundancy Check(CRC) | |

FIG. 9

| 15 | Prefix Component | 0 |
|---|---|---|
| 127 | Header Component | |
| | | 0 |
| 128*n-1 | Data Component | |
| | | 0 |
| 31 | CRC Component | 0 |

FIG. 10

| 15  | Prefix Component | 0 |
|-----|------------------|---|
| 127 | Header Component | 0 |
| 31  | CRC Component    | 0 |

FIG. 11

| 15 | Prefix Component | 0 |
|---|---|---|
| $128*n-1$ | Data Component | |
| | | 0 |
| 31 | CRC Component | |
| | | 0 |

FIG. 13

| 7 | 6 5 | 4 3 2 1 | 0 | 15 14 13 12 11 10 9 8 |
|---|---|---|---|---|
| 1 | 11 | [01/10/11]00 | 0 | Data Credit [7:0] |
| TC | FC | Init/Ack/U | Rsv | |

| 23 22 21 20 19 18 17 16 | 31 30 29 28 27 26 25 24 |
|---|---|
| Header Credit [7:0] | Ack/Nacked Sequence Number [7:0] |

FIG. 14

| 7 | 6 | 5 | 4 | 3 | 2 | 1 | 0 | 15 | 14 | 13 | 12 | 11 | 10 | 9 | 8 |
|---|---|---|---|---|---|---|---|---|---|---|---|---|---|---|---|
| 1 | 00 | | 0000/0001 | | | | 0 | Data Credit [7:0] | | | | | | | |
| TC | DI | | Ack/Nak | | | | Rsv | | | | | | | | |

| 23 | 22 | 21 | 20 | 19 | 18 | 17 | 16 | 31 | 30 | 29 | 28 | 27 | 26 | 25 | 24 |
|---|---|---|---|---|---|---|---|---|---|---|---|---|---|---|---|
| Header Credit [7:0] | | | | | | | | Ack/Nacked Sequence Number [7:0] | | | | | | | |

SERIAL COMMUNICATION METHOD AND SYSTEM FOR MEMORY ACCESS

CROSS-REFERENCE TO RELATED APPLICATION

This application claims priority to and the benefit of Korean Patent Application No. 10-2021-0041403 filed in the Korean Intellectual Property Office on Mar. 30, 2021, the entire contents of which are incorporated herein by reference.

BACKGROUND OF THE DISCLOSURE

(a) Field of the Disclosure

The present disclosure relates to a serial communication method and system for memory access.

(b) Description of the Related Art

Due to the limitations of clock frequencies operable in signal lines, parallel communication has been used for communication between a processor and a memory in a computer system. In the case of using the parallel communication, a bandwidth was increased even if the range of operable clock frequencies was limited, but since many signal lines was required, it was difficult to route the signal lines and the scalability was low. In addition, in the case of the parallel communication, in an architecture in which a plurality of processors shares one memory, implementation difficulty and complexity are high.

Recently, since the clock frequencies operable in the signal lines may be sufficiently increased, serial communication may be used while securing a desired bandwidth. However, since a communication interface between the processor and the memory is still implemented in a parallel communication structure, a technique capable of converting the parallel communication structure into a serial communication structure has been required. In particular, recently, a structure in which a plurality of processors share a single memory have attracted attention, and thus, the importance of a technique for converting the parallel communication structure between the processor and the memory to the serial communication structure is greater.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide serial communication method and system capable of converting a parallel communication structure between a processor and a memory into a serial communication structure.

An example embodiment of the present disclosure provides a serial communication system for memory access including a processor-side processor that receives a memory transaction from a processor and converts the memory transaction into a packet according to a predetermined phase to serially transmit the packet; and a memory-side processor that receives the serially transmitted packet according to the predetermined phase and converts the packet into the memory transaction to access a memory, wherein the predetermined phase includes a channel establishment phase, a flow control initialization phase, and a memory transaction phase.

In some example embodiment of the present disclosure, the channel predetermined phase may include confirming the aliveness of a transmission channel by transceiving a training sequence packet and a training sequence acknowledgement packet to each other by means of the processor-side processor and the memory-side processor.

In some example embodiment of the present disclosure, the channel predetermined phase may include transmitting a training sequence packet assigned with a transmission channel number to the processor-side processor by means of the memory-side processor; storing the transmission channel number by means of the processor-side processor; and transmitting a training sequence acknowledgement packet to the memory-side processor by means of the processor-side processor.

In some example embodiment of the present disclosure, the channel predetermined phase may include transmitting a training sequence packet assigned with a transmission lane number to the processor-side processor by means of the memory-side processor; storing the transmission lane number by means of the processor-side processor; and transmitting a training sequence acknowledgement packet to the memory-side processor by means of the processor-side processor.

In some example embodiment of the present disclosure, the channel predetermined phase may include transceiving a training sequence acknowledgement packet to each other by means of the processor-side processor and the memory-side processor to complete the configuration of the transmission channel and the transmission lane, after the configuration of the transmission channel number and the transmission lane number is completed.

In some example embodiment of the present disclosure, the flow control initialization phase may include performing the flow control initialization by transceiving a flow control initialize packet and a flow control initialize acknowledgement packet to each other by means of the processor-side processor and the memory-side processor.

In some example embodiment of the present disclosure, the performing of the flow control initialization may include transmitting a flow control initialize packet representing a state of a payload receiving buffer to the memory-side processor by means of the processor-side processor; recording the state of the payload receiving buffer by means of the memory-side processor; and transmitting a flow control initialize acknowledgement to the processor-side processor by means of the memory-side processor.

In some example embodiment of the present disclosure, the performing of the flow control initialization may include transmitting a flow control initialize packet representing states of a header and a payload receiving buffer to the processor-side processor by means of the memory-side processor; recording the states of the header and the payload receiving buffer by means of the processor-side processor; and transmitting a flow control initialize acknowledgement to the memory-side processor by means of the processor-side processor.

In some example embodiment of the present disclosure, the memory transaction phase may include transmitting a memory write packet to the memory-side processor by means of the processor-side processor; transmitting a memory write acknowledgement packet to the processor-side processor by means of the memory-side processor; performing a memory write transaction for the memory by means of the memory-side processor; and transmitting a flow control update packet for updating the receiving buffer state of the memory-side processor to the processor-side processor.

In some example embodiment of the present disclosure, the memory transaction phase may include transmitting a memory read packet to the memory-side processor by means of the processor-side processor; transmitting a memory read acknowledgement packet to the processor-side processor by means of the memory-side processor; transmitting a flow control update packet for updating the receiving buffer state of the memory-side processor to the processor-side processor; transmitting a memory read response packet to the processor-side processor by means of the memory-side processor; and transmitting a flow control update packet for updating the receiving buffer state of the processor-side processor to the memory-side processor.

Another example embodiment of the present disclosure provides a serial communication method for memory access including the steps of: receiving a memory transaction from a processor; converting the memory transaction into a packet according to a predetermined phase; and serially transmitting the packet through a serial packet signal line, wherein the predetermined phase includes a channel establishment phase, a flow control initialization phase, and a memory transaction phase.

In some example embodiment of the present disclosure, the channel predetermined phase may include receiving a training sequence packet assigned with at least one of a transmission channel number and a transmission lane number through the serial packet signal line; storing at least one of the transmission channel number and the transmission lane number; and transmitting a training sequence acknowledgement packet through the serial packet signal line.

In some example embodiment of the present disclosure, the flow control initialization phase may include receiving a flow control initialize packet representing states of a header and a payload receiving buffer through the serial packet signal line; recording the states of the header and the payload receiving buffer; and transmitting a flow control initialize acknowledgement through the serial packet signal line.

In some example embodiment of the present disclosure, the memory transaction phase may include transmitting a memory write packet through the serial packet signal line; receiving a memory write acknowledgement packet through the serial packet signal line; and receiving a flow control update packet through the serial packet signal line.

In some example embodiment of the present disclosure, the memory transaction phase may include transmitting a memory read packet through the serial packet signal line; receiving a memory read acknowledgement packet through the serial packet signal line; receiving a first flow control update packet through the serial packet signal line; receiving a memory read response packet through the serial packet signal line; and transmitting a second flow control update packet through the serial packet signal line.

Yet another example embodiment of the present disclosure provides a serial communication method for memory access including the steps of: receiving a packet serially transmitted through a serial packet signal line according to a predetermined phase; converting the packet into a memory transaction; and accessing the memory according to the memory transaction, wherein the predetermined phase includes a channel establishment phase, a flow control initialization phase, and a memory transaction phase.

In some example embodiment of the present disclosure, the channel predetermined phase may include transmitting a training sequence packet assigned with at least one of a transmission channel number and a transmission lane number through the serial packet signal line; and transmitting a training sequence packet assigned with at least one of a transmission channel number and a transmission lane number through the serial packet signal line; and.

In some example embodiment of the present disclosure, the flow control initialization phase may include receiving a flow control initialize packet representing a state of a payload receiving buffer through the serial packet signal line; recording the state of the payload receiving buffer; and transmitting a flow control initialize acknowledgement through the serial packet signal line.

In some example embodiment of the present disclosure, the memory transaction phase may include receiving a memory write packet through the serial packet signal line; transmitting a memory write acknowledgement packet through the serial packet signal line; performing a memory write transaction for the memory; and transmitting a flow control update packet through the serial packet signal line.

In some example embodiment of the present disclosure, the memory transaction phase may include receiving a memory read packet through the serial packet signal line; transmitting a memory read acknowledgement packet through the serial packet signal line; transmitting a first flow control update packet through the serial packet signal line; transmitting a memory read response packet through the serial packet signal line; and receiving a second flow control update packet through the serial packet signal line.

According to the example embodiments of the present disclosure, since the serial communication is provided between the processor and the memory, the routing between the processor and the memory is flexible and it is easy to expand a bandwidth for improving the performance, and a header structure optimized to the serial communication between the processor and the memory is adopted to reduce the unnecessary overhead, thereby improving the overall bandwidth performance. In addition, it is possible to enhance the possibility and ease of implementing an architecture in which a plurality of processors shares one memory, and applications such as data exchange between a plurality of processors are enabled.

BRIEF DESCRIPTION OF THE DRAWINGS

FIGS. 4 to 14 are diagrams illustrating example embodiments of packets used in the serial communication system for memory access according to an example embodiment of the present disclosure.

DETAILED DESCRIPTION OF THE EMBODIMENTS

Figure 1:
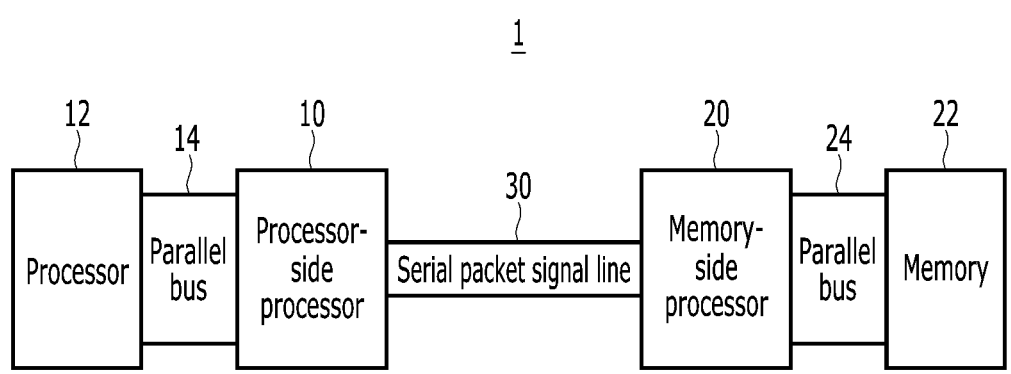
FIG. 1 is a diagram for describing a serial communication system for memory access according to an example embodiment of the present disclosure.

The present disclosure will be described more fully hereinafter with reference to the accompanying drawings, in which example embodiments of the disclosure are shown. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Through this specification and appended claims, unless explicitly described to the contrary, the word "comprise", and variations such as "comprises" or "comprising", will be understood to imply the inclusion of stated elements but not the exclusion of any other elements.

In addition, terms including "part', "unit", "module", and the like disclosed in the specification mean a unit that processes at least one function or operation and this may be implemented by hardware or software or a combination of hardware and software.

FIG. 1 is a diagram for describing a serial communication system for memory access according to an example embodiment of the present disclosure.

Referring to FIG. 1, a serial communication system 1 for memory access according to an example embodiment of the present disclosure may include a processor-side processor 10, a processor 12, a parallel bus 14, a memory-side processor 20, a memory 22, a parallel bus 24 and a serial packet signal line 30. The processor-side processor 10 may receive a memory transaction from the processor 12 and convert the memory transaction into a serial transmission packet. Specifically, the processor-side processor 10 is electrically connected to the processor 12 through the parallel bus 14, and may convert the memory transaction received through the parallel bus 14 into a packet according to a predetermined phase. The processor-side processor 10 may serially transmit the converted packet through the serial packet signal line 30.

Here, the processor 12 may include a central processing unit (CPU), an application processor (AP), graphics processing units (GPU), field-programmable gate arrays (FPGA), application-specific integrated circuits (ASIC), a digital signal processor (DSP), and the like, but the scope of the present disclosure is not limited thereto.

On the other hand, the memory-side processor 20 may receive the serially transmitted packet and convert the packet into the memory transaction to access the memory 22. Specifically, the memory-side processor 20 may receive the packet through the serial packet signal line 30 according to a predetermined phase, and perform the memory access through the parallel bus 14. Although not illustrated in FIG. 1, the memory 22 may include a memory controller and a memory cell area therein.

Here, the memory 22 may be implemented as a volatile memory device including a dynamic random access memory (DRAM) and a static random access memory (SRAM), implemented as a non-volatile memory device including a flash memory, or implemented in a combination of the volatile memory device and the non-volatile memory device.

The serial packet signal line 30 is a signal line that supports serial packet communication between the processor-side processor 10 and the memory-side processor 20 and may be implemented as, for example, a cable assembly, but the scope of the present disclosure is not limited thereto. Meanwhile, the parallel buses 14 and 24 may be implemented as a system-on-chip (SOC) bus interface, but the scope of the present disclosure is not limited thereto.

That is, according to various example embodiments of the present disclosure, based on packet communication, it is possible to convert a structure of transceiving a parallel signal between the processor 12 and the memory 22 into a structure of transceiving the packet to the serial signal. Next, a predetermined phase of three steps of defining an operation step of the processor-side processor 10 and the memory-side processor 30 will be described with reference to FIG. 2.

Figure 2:
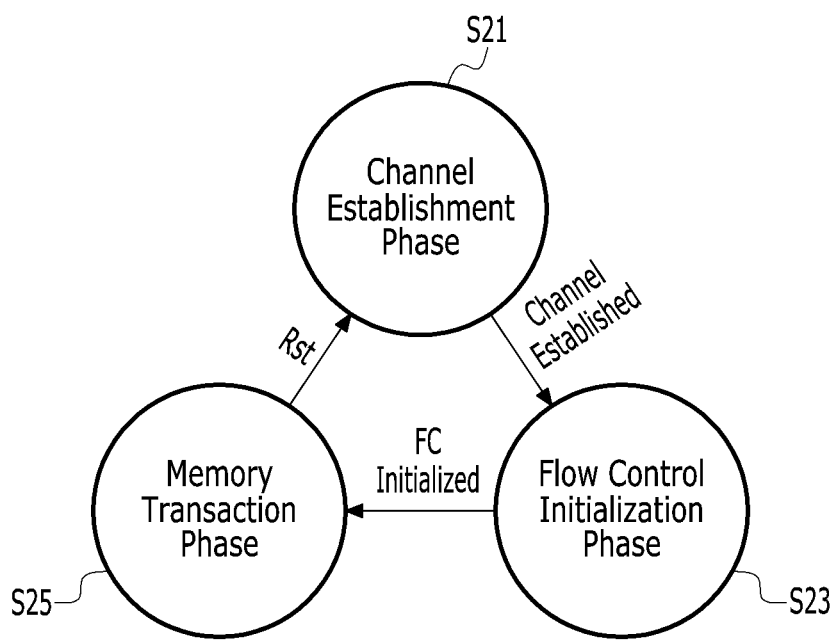
FIG. 2 is a diagram for describing an operation of the serial communication system for memory access according to an example embodiment of the present disclosure.

FIG. 2 is a diagram for describing an operation of the serial communication system for memory access according to an example embodiment of the present disclosure.

Referring to FIG. 2, the processor-side processor 10 and the memory-side processor 30 may operate according to a predetermined phase of three steps. Specifically, the predetermined phase may include a channel establishment phase S21, a flow control initialization phase S23, and a memory transaction phase S25.

The channel predetermined phase S21 is a phase which mutually confirms the aliveness of a transmission channel between the processor-side processor 10 and the memory-side processor 20 and configures the transmission channel through a process of specifying numbers and the number of transmission channels and transmission lanes, and the like.

The flow control initialization phase S23 is a phase that informs buffer information of an element of receiving the packet for flow control to an element of transmitting the packet.

The memory transaction phase S25 is a phase that accesses the memory 22 while memory write, memory read, and memory read response packets are transmitted and received, and a phase in which the flow control is performed together to continuously update a state of the buffer.

When the transmission channel is established through the channel predetermined phase S21, the phase is transited to the flow control initialization phase S23 and when the flow control is initialized through the flow control initialization phase S23, the phase is transited to the memory transaction phase S25 to perform the memory access. When a reset condition such as power re-application is satisfied (Rst), the phase may be transited to the channel predetermined phase S21 again.

Figure 3:
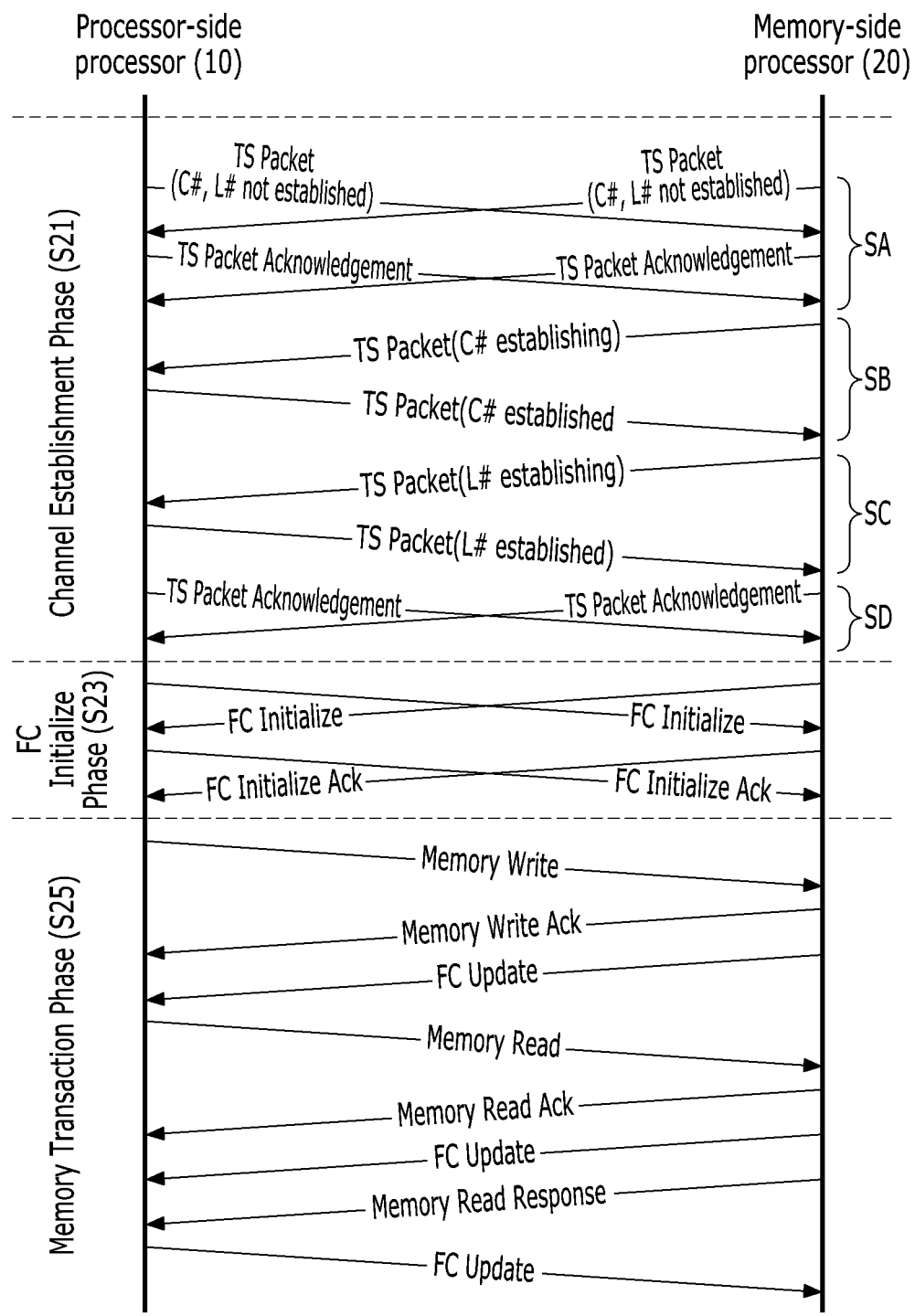
FIG. 3 is a diagram for describing a serial communication method for memory access according to an example embodiment of the present disclosure.

FIG. 3 is a diagram for describing a serial communication method for memory access according to an example embodiment of the present disclosure.

Referring to FIG. 3, a serial communication method for memory access according to an example embodiment of the present disclosure illustrates an operation between the processor-side processor 10 and the memory-side processor 20 in the channel predetermined phase S21, the flow control initialization phase S23 and the memory transaction phase S25.

When power is applied to the serial communication system for memory access, system initialization may be performed according to a predetermined method. For example, when the power is applied to the processor-side processor 10 and the memory-side processor 20, Power-On-Reset is asserted, Reset is asserted, and then the processor-side processor 10 and the memory-side processor 20 may enter the channel predetermined phase S21.

First, the channel predetermined phase S21 may include a step SA of confirming the aliveness of the transmission channel by transceiving a training sequence packet and a training sequence acknowledgement packet by means of the processor-side processor 10 and the memory-side processor 20. Specifically, in step SA, when each of the processor-side processor 10 and the memory-side processor 20 transmits a training sequence packet without assigned transmission channel number C# and transmission lane number L# to the other party and receives the training sequence packet without assigned transmission channel number C# and transmission lane number L#, the processor-side processor 10 and the memory-side processor 20 may confirm the aliveness of the transmission channel by transmitting the sequence acknowledgement packet to the other party.

Next, the channel predetermined phase S21 may include a step SB of transmitting a training sequence packet assigned with a transmission channel number C# to the processor-side processor 10 by means of the memory-side processor 20, storing the transmission channel number C# by means of the processor-side processor 10, and transmitting the training sequence acknowledgement packet to the memory-side processor 20 by means of the processor-side processor 10. Here, the training sequence acknowledgement packet transmitted to the memory-side processor 20 by means of the processor-side processor 10 is reflected with the transmission channel number C# assigned by the memory-side processor 20

Further, the channel predetermined phase S21 may include a step SC of transmitting the training sequence packet assigned with a transmission lane number L# to the processor-side processor 10 by means of the memory-side processor 20, storing the transmission lane number L# by means of the processor-side processor 10, and then transmitting the training sequence acknowledgement packet to the memory-side processor 20 by means of the processor-side processor 10. Here, the training sequence acknowledgement packet transmitted to the memory-side processor 20 by means of the processor-side processor 10 is reflected with the transmission lane number L# assigned by the memory-side processor 20.

In steps SB and SC, the reason why the memory-side processor 20 assigns the transmission channel number C# and the transmission lane number L# is that when a plurality of processor-side processors 10 is connected to one memory-side processor 20, a plurality of channels to be established are divided, and the number of activated channels, the number of lanes of the activated channels, and the like are recognized to inspect the condition of the signal line.

Next, the channel predetermined phase S21 may include a step SD of transceiving the training sequence acknowledgement packet to each other by means of the processor-side processor 10 and the memory-side processor 20 to complete the configuration of the transmission channel and the transmission lane, after the configuration of the transmission channel number and the transmission lane number is completed. Specifically, when the memory-side processor 20 receives the training sequence acknowledgement packet established to the transmission channel number C# and the transmission lane number L# assigned by the memory-side processor 20 from the processor-side processor 10 in steps SB and SC, it may be considered that the channel establishment is completed, and in step SD, the memory-side processor may transmit the training sequence acknowledgement packet to the processor-side processor 10. It may be considered that even in the processor-side processor 10 receiving the training sequence acknowledgement packet, the channel establishment is completed.

Each of the processor-side processor 10 and the memory-side processor 20 considering that the channel establishment is completed may enter the flow control initialization phase S23.

The flow control initialization phase S23 may include a step of performing the flow control initialization by transceiving a flow control initialize packet and a flow control initialize acknowledgement packet to each other by means of the processor-side processor 10 and the memory-side processor 20.

However, since the processor-side processor 10 transmits a memory write packet or a memory read packet to the memory-side processor 20, the memory-side processor 20 needs to provide a header buffer and a payload buffer related with the memory write packet or the memory read packet as a receiving buffer, while since the memory-side processor 20 transmits a memory read response packet to the processor-side processor 10, the processor-side processor 10 may provide only a payload buffer as the receiving buffer. Therefore, information transmitted to the other party by means of the processor-side processor 10 and the memory-side processor 20 for the flow control initialization may be different from each other.

Specifically, a step of performing the flow control initialization in the flow control initialization phase S23 may include transmitting the flow control initialize packet representing a state (e.g., size) of the payload receiving buffer to the memory-side processor 20 by means of the processor-side processor 10; recording the state of the payload receiving buffer by means of the memory-side processor 20; and transmitting the flow control initialize acknowledgement to the processor-side processor 10 by means of the memory-side processor 20.

Meanwhile, a step of performing the flow control initialization in the flow control initialization phase S23 may include transmitting the flow control initialize packet representing states (e.g., size) of a header and a payload receiving buffer to the processor-side processor 10 by means of the memory-side processor 20; recording the states of the header and the payload receiving buffer by means of the processor-side processor 10; and transmitting the flow control initialize acknowledgement to the memory-side processor 20 by means of the processor-side processor 10.

Thereafter, the processor-side processor 10 and the memory-side processor 20 receiving the flow control initialize acknowledgement from the other party consider that the flow control initialization is completed and may enter the memory transaction phase (or a normal packet transceiving phase) S25, respectively.

In the memory transaction phase (or the normal packet transceiving phase) S25, the processor-side processor 10 may transmit a memory write packet or memory read packet to the memory-side processor 20 and the memory-side processor 20 may transmit a memory read response packet to the processor-side processor 10. Further, the processor-side processor 10 and the memory-side processor 20 may transmit an acknowledgement packet representing the normal reception of the packet to the other party, wherein the acknowledgement packet may include an acknowledgement packet Ack or a not acknowledgement packet Nak.

Meanwhile, in the memory transaction phase S25, the processor-side processor 10 and the memory-side processor 20 may transmit a flow control update packet. However, when the processor-side processor 10 and the memory-side processor 20 receive the packet, the size of the buffer is reduced and when the received packet is consumed, the size of the buffer is increased, and thus, a change in size of the buffer is (periodically or aperiodically) transmitted to the other party to prevent the overflow of the buffer.

Specifically, the memory transaction phase S25 may include transmitting a memory write packet to the memory-side processor 20 by means of the processor-side processor 10; transmitting a memory write acknowledgement packet to the processor-side processor 10 by means of the memory-side processor 20; performing a memory write transaction for the memory 22 by means of the memory-side processor 20; and transmitting a flow control update packet for updating a received buffer state of the memory-side processor 20 to the processor-side processor 10. Here, the memory write packet may include a header and data (payload).

Note, it is not meant that the step of performing the memory write transaction for the memory 22 by means of the memory-side processor 20 is performed between the step of transmitting the memory write acknowledgement packet to the processor-side processor 10 by means of the memory-side processor 20 and the step of transmitting the flow control update packet for updating the receiving buffer state of the memory-side processor 20 to the processor-side processor 10, and the performing order is not limited to a specific order and may vary according to a specific implementation purpose or method.

The step of performing the memory write transaction for the memory 22 by means of the memory-side processor 20 may include extracting an address assigned in the received memory write packet and byte activation information to transmit the address and the byte activation information to a memory controller in a memory interface form and transmitting the memory write payload packet to the memory controller together. In addition, the memory controller may generate a signal related with the memory write to access the memory 22 and perform the data write.

Meanwhile, the memory transaction phase S25 may include transmitting a memory read packet to the memory-side processor 20 by means of the processor-side processor 10; transmitting a memory read acknowledgement packet to the processor-side processor 10 by means of the memory-side processor 20; transmitting a flow control update packet for updating a receiving buffer state of the memory-side processor 20 to the processor-side processor 10; transmitting a memory read response packet to the processor-side processor 10 by means of the memory-side processor 20; and transmitting a flow control update packet for updating a receiving buffer state of the processor-side processor 10 to the memory-side processor 20. Here, the memory read packet may include only a header.

The memory-side processor 20 may extract an address assigned in the received memory read packet and byte activation information to transmit the address and the byte activation information to a memory controller in a memory interface form and the memory controller may generate a signal related with the memory read to access the memory 22 and perform the data read. The read data is converted into the memory read response packet again to be transmitted to the processor-side processor 10 and the processor-side processor 10 may generate an acknowledgement packet in response thereto to transmit the generated acknowledgement packet to the memory-side processor 20.

Meanwhile, in some example embodiments of the present disclosure, the serial communication method for memory access may further include a method for processing memory transaction errors.

Specifically, when a transmission side has a copy of its transmitting packet and then receives an acknowledged packet from a reception side, the transmission side discards the copy stored up to a sequence assigned in the acknowledgement packet, and when the transmission side receives a not acknowledged packet, the transmission side may perform re-transmission from a sequence number to the last transmitted packet received from the not acknowledged packet. Of course, the re-transmission may be performed when acknowledgement Ack or not acknowledgement Nak is not received for a predetermined time as well as when the not acknowledgement Nak is received. Accordingly, since the packet is normally received, but an error may occur in the process of transmitting the acknowledgement Ack or the not acknowledgement Nak, if the packet has a sequence number of the pre-received packet when the retransmitted packet is received, the reception side may include a mechanism of quietly discarding the packet without recognizing this packet as an error.

Meanwhile, in some example embodiments of the present disclosure, the serial communication method for memory access may further include a method for extending a bandwidth.

Specifically, the transmission channel may also be configured only one lane and at this time, a bandwidth may be calculated by bit width x operating frequency of each lane. Unlike this, in some example embodiments of the present disclosure, the transmission channel may be configured by multilanes.

The same processor may be increased to an integer multiple to increase the bandwidth. However, in the case of generating a memory write packet, the header may be generated only in one lane, and only packets configured by data are generated in the remaining lanes. In the case of other communication schemes, since a method of spreading data to lanes is taken, when a reach time of data varies for each lane, there is a problem to combine the data, and thus, it is necessary to adjust the skew between the lanes, but in the communication scheme of the present disclosure, the lane varies for each bit field of the data. For example, when two lanes are used, the first lane is responsible for ½ data of the bus width of the processor side and the second lane is responsible for the remaining ½ data. Accordingly, even if data arrives at different times, the buffer is included therein to inspect whether all parts of a data component are arrived in the buffer, and may access the memory bus only when all parts arrived, thereby processing the data without paying attention to the skew between the lanes.

Since the extended lane handles only the data, a packet form handled in the extended lane may have the same form as the memory read response packet. In the communication scheme of the present disclosure, a data integrity packet is generated/consumed for each lane to handle data integrity for each lane, and the retransmission buffer is also included for each lane. However, in the case of the flow control packet, even though the lane is extended, since the flow control packet needs to be handled as one data, the flow control packet is generated in only one lane, and the receiving buffer information may be used in all lanes.

Hereinafter, packets used in the serial communication system for memory access according to an example embodiment of the present disclosure will be described with reference to FIGS. 4 to 14.

FIGS. 4 to 14 are diagrams illustrating example embodiments of packets used in the serial communication system for memory access according to an example embodiment of the present disclosure.

Referring to FIG. 4, the training sequence packet and the training sequence acknowledgement packet used in the channel predetermined phase S21 may consist of, for example, 16 bits, and may include a field Ch consisting of 1 bit for identifying a channel establishment packet, a field Ts consisting of 1 bit for identifying a training sequence packet, a field Ack consisting of 1 bit for identifying training sequence acknowledgement, a reserved field consisting of 3 bits, a transmission channel number field consisting of 6 bits, and a transmission lane number field consisting of 4 bits.

Further, when the value of the transmission channel number field is 1, it may be shown that the transmission channel number is not assigned, and when the value of the transmission lane number field is 1, it may be shown that the transmission lane number is not assigned. Accordingly, 32 transmission channels can be assigned, and 8 transmission lanes can be assigned.

Meanwhile, the memory write packet and the memory read packet used in memory transaction phase S25 may include a prefix, a header, data, and a CRC component, respectively.

Figure 5:
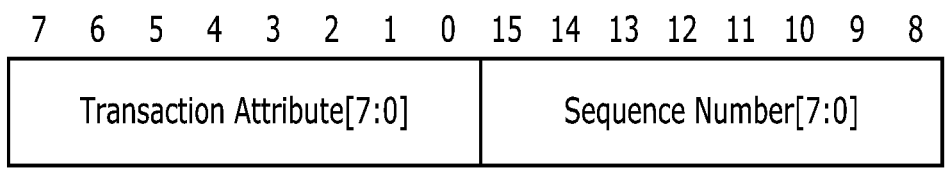

Referring to FIG. 5, the prefix may consist of, for example, 16 bits, and may include a transaction attribute field consisting of 8 bits and a sequence number field consisting of 8 bits.

The transaction attribute field may be used to extend a future communication scheme as a field for specifying a transactional handling method, and may be assigned as a reserved field if not used.

The sequence number field gives a unique number for the transaction, and when an error occurs or a transaction is lost during the transmission of the transaction, the reception side may inform the transmission error or loss of the transaction based on the given number and accordingly, the transmission side may also regenerate the transaction.

Figure 6:
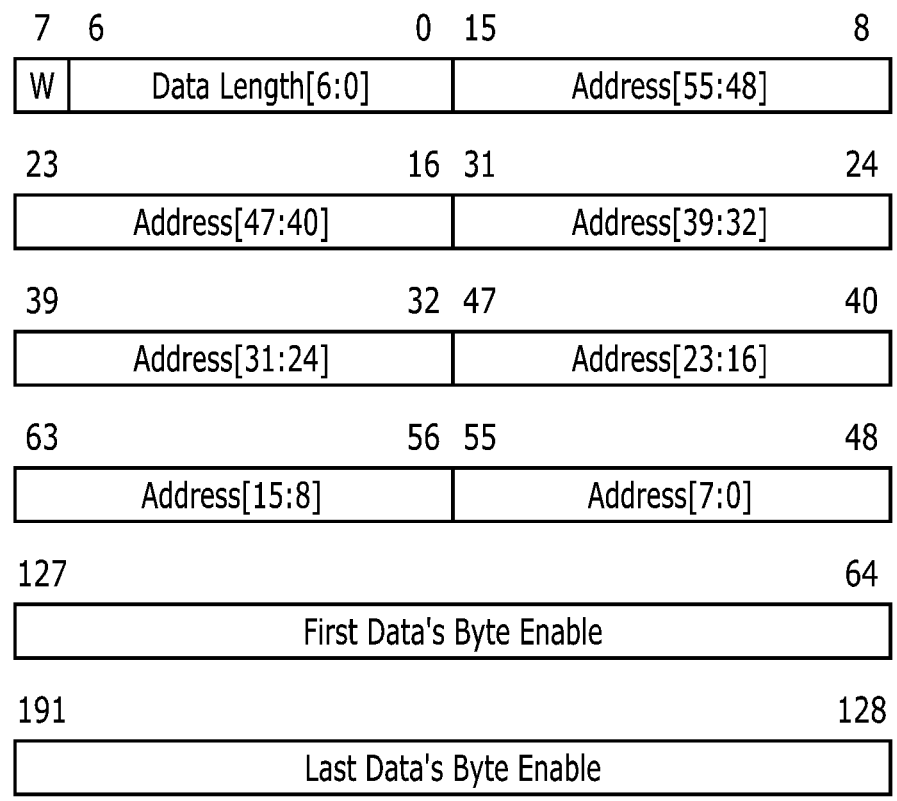

Referring to FIG. 6, the header may consist of, for example, 192 bits, and may include a field W consisting of 1 bit for identifying whether the memory transaction is the memory write or the memory read, a data length field consisting of 7 bits, an address field consisting of 56 bits, a first data's byte enable field consisting of 64 bits, and a last data's byte enable field consisting of 64 bits, and the like.

Here, in the case of the memory write, since the value of the field W may be configured to 1 and the data length field is 7 bits, length encoding of 0 to 127 is enabled, but 64 128-bit data reads are performed, so that encoding of 1 to 128 is used and encoding of 129 or more may not be used. Further, the memory write is designed as a communication system that can read a zero length, for example, to be applied to a flush operation.

The byte enable fields (the first data's byte enable field and the last data's byte enable field) are allocated by 64 bits, respectively, and in one lane, the byte enable for 16 bytes of 128 bits is required. However, since the communication system of the present disclosure considers a structure capable of extending up to 4 lanes, the byte enable fields (the first data's byte enable field and the last data's byte enable field) may be assigned to 64 bytes by considering the extension of 4 channels. If the number of lanes exceeds 4, an additional byte enable field may also be required, and thus, the length of the header may further increase.

Figure 7:
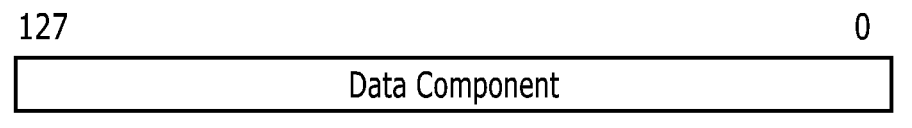
Figure 8:
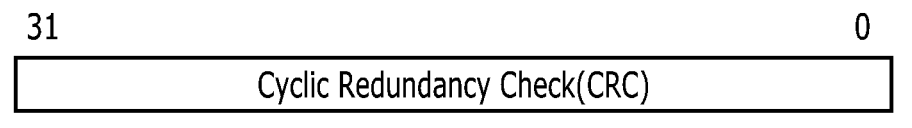

Referring to FIG. 7, the data may be implemented by, for example, a 128-bit unit, and up to 64 data packets of a 128-bit unit may be appended. Subsequently, referring to FIG. 8, the CRC component may consist of, for example, 32 bits.

Referring to FIG. 9, the memory write packet may include a 16-bit prefix component, a 128-bit header component, at least one CRC component connected with a 128-bit unit, and a 32-bit CRC component. Here, the CRC component may include a CRC value that is generated by performing a bit operation for the prefix component, the header component, and the data component.

Referring to FIG. 10, the memory read packet may include a 16-bit prefix component, a 128-bit header component, and a 32-bit CRC component. Here, the CRC component may include a CRC value generated by performing a bit operation for the prefix component and the header component.

Referring to FIG. 11, the memory read response packet may include a 16-bit prefix component, one or more data components connected with 128-bit units, and a 32-bit CRC component. Here, the CRC component may include a CRC value generated by performing a bit operation for the prefix component and the data component.

Figure 12:
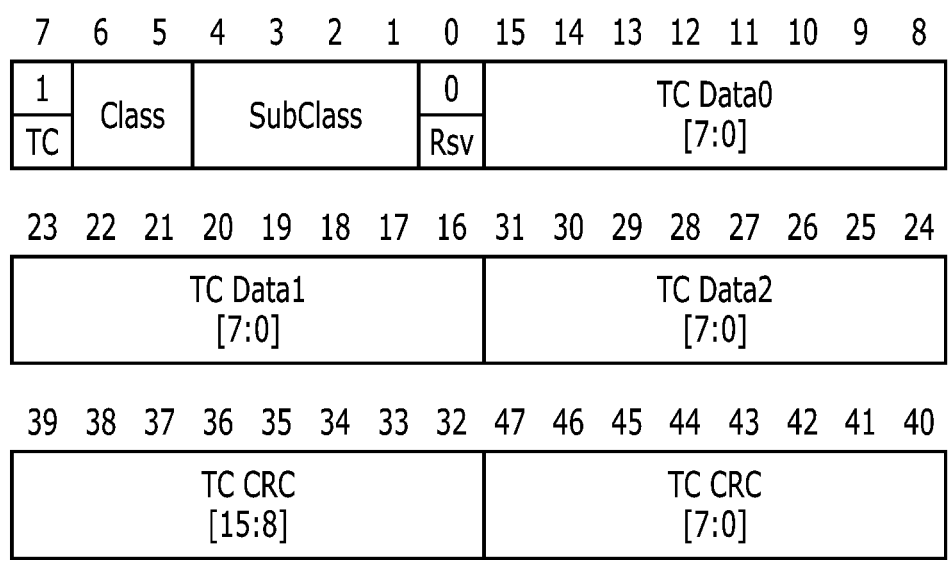

Referring to FIG. 12, the flow control initialize packet may consist of, for example, 48 bits, and may include a 32-bit packet core and a 16-bit CRC.

A first byte of the packet core includes a field TC that identifies the transaction control packet, a field Class that represents a class of the transaction control packet, a field SubClass that represents a subclass of the transaction control packet, and a reserved field Rsv. The meaning contents of second to fourth bytes of the packet core may vary depending on the contents of the field Class and the field SubClass.

Referring to FIG. 13, the flow control packet may include a 32-bit packet core and an additional CRC.

In the packet core, the lowest byte has a field FC for indicating the flow control and a field Init/Ack/U for identifying initialize, initialize Ack, or Update in the flow control packet. The second byte represents a data credit in the buffer, and a unit of credit is a 128-bit buffer unit. The third byte is a header credit, and a unit of this credit is also a 128-bit buffer unit. The last fourth byte is left as the reserved field, but may also transmit a field that displays a received sequence number to consider the integration of a flow control packet and a data integrity packet in the future.

In the flow control packet, the initialize and ACK packets are used in the flow control initialization phase S21, and the Update packet is used in the memory transaction phase S25, and the role indicates a state of the receiving buffer. The processor side processor 10 generates a memory request transaction and in the memory request transaction, since a header and data are coupled (in the case of memory write) and only a header (in the case of memory read) is configured, the memory-side processor 20 needs to have a buffer to receive the memory request transaction. Therefore, in the memory-side processor 20, the header credit and the data credit are transmitted on the related buffer. On the contrary, since the memory-side processor 20 generates a memory read response and the memory read response is transmitted to the processor-side processor 10, the processor-side processor 10 has only a data buffer. Thus, in this regard, the processor-side processor 10 and the memory-side processor 20 transmit their buffer sizes, and the memory-side processor 20 transmits both the header credit and the data credit, but the processor-side processor 10 has no header buffer, so that the content field of the header credit is not used.

When the reception side normally receives the packet, an acknowledged packet having a sequence number normally received up to date is transmitted, and when the reception side does not normally receive the packet, a not acknowledged packet having a sequence number normally received up to date is transmitted, and the core structure of the packet may be implemented as illustrated in FIG. 14.

Of course, the forms of the packets shown in FIGS. 4 to 14 are only illustrative, and the detailed contents such as the structures of the packets, the size of each field, and the like according to an implementation purpose may be changed anytime.

Figure 15:
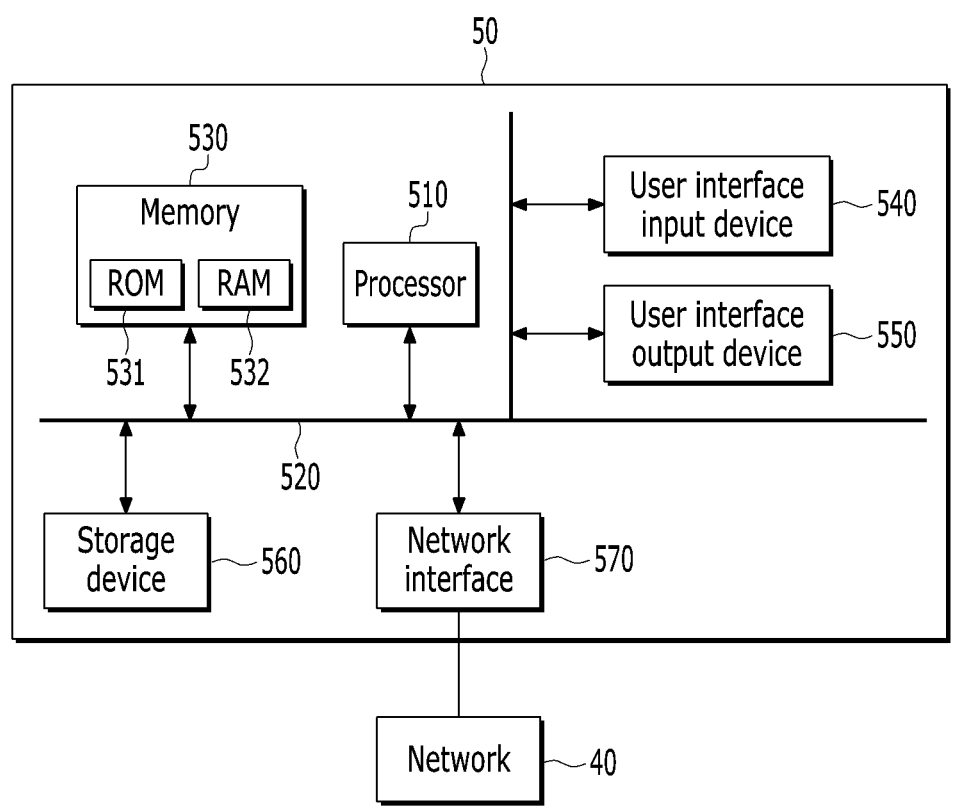
FIG. 15 is a block diagram for describing a computing apparatus for implementing serial communication method and system according to example embodiments of the present disclosure.

FIG. 15 is a block diagram for describing a computing apparatus for implementing serial communication method and system according to example embodiments of the present disclosure.

Referring to FIG. 15, the serial communication method and system for memory access according to example embodiments of the present disclosure may be implemented using a computing apparatus 50.

The computing apparatus 50 includes at least one of a processor 510, a memory 530, a user interface input device 540, a user interface output device 550, and a storage device 560, which communicate via a bus 520. The computing apparatus 50 may also include a network interface 570 which is electrically connected to the network 40, for example, a wireless network The network interface 570 may transmit or receive signals from or to other objects through the network 40.

The processor 510 may be implemented by various types such as an application processor (AP), a central processing unit (CPU), a graphic processing unit (GPU), and the like, and may be any semiconductor device executing instructions stored in the memory 530 or the storage device 560. The processor 510 may be configured to implement the functions and methods described in FIGS. 1 to 14.

The memory 530 and the storage device 560 may include various types of volatile or non-volatile storage media. For example, the memory may include a read-only memory (ROM) 531 and a random access memory (RAM) 532. In an example embodiment of the present disclosure, the memory 530 may be located inside or outside the processor 510, and the memory 530 may be connected with the processor 510 through various known means.

Further, the serial communication method and system for memory access according to example embodiments of the present disclosure may be implemented by programs or software executed in the computing apparatus 50, and the programs or software may be stored in computer readable media.

Further, the serial communication method and system for memory access according to example embodiments of the present disclosure may be implemented by hardware which may be electrically connected with the computing apparatus 50.

According to the example embodiments of the present disclosure described above, the serial communication is provided between the processor and the memory, the routing between the processor and the memory is flexible and it is easy to expand a bandwidth for improving the performance, and a header structure optimized to the serial communication between the processor and the memory is adopted to reduce the unnecessary overhead, thereby improving the overall bandwidth performance. In addition, it is possible to enhance the possibility and ease of implementing an architecture in which a plurality of processors shares one memory, and applications such as data exchange between a plurality of processors are enabled.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A serial communication system for memory access, the serial communication system comprising:
   a processor-side processor that receives a parallel-based memory transaction from a processor and converts the parallel-based memory transaction into a packet according to a predetermined phase to serially transmit the packet; and
   a memory-side processor that receives the serially transmitted packet according to the predetermined phase and converts the packet into the parallel-based memory transaction to access a memory,
   wherein the predetermined phase includes a channel establishment phase, a flow control initialization phase, and a memory transaction phase,
   wherein the channel establishment phase is applied to the flow control initialization phase which is subsequently applied to the memory transaction phase which is subsequently applied to the channel establishment phase when a reset condition is satisfied, and
   wherein a type of the packet is activated differently according to the channel establishment phase, the flow control initialization phase, and the memory transaction phase.

2. The serial communication system for memory access of claim 1, wherein:
   the channel establishment phase includes
   confirming the aliveness of a transmission channel by transceiving a training sequence packet and a training sequence acknowledgement packet to each other by means of the processor-side processor and the memory-side processor.

3. The serial communication system for memory access of claim 1, wherein:
   the channel establishment phase includes
   transmitting a training sequence packet assigned with a transmission channel number to the processor-side processor by means of the memory-side processor;
   storing the transmission channel number by means of the processor-side processor; and
   transmitting a training sequence acknowledgement packet to the memory-side processor by means of the processor-side processor.

4. The serial communication system for memory access of claim 1, wherein:
   the channel establishment phase includes
   transmitting a training sequence packet assigned with a transmission lane number to the processor-side processor by means of the memory-side processor;
   storing the transmission lane number by means of the processor-side processor; and
   transmitting a training sequence acknowledgement packet to the memory-side processor by means of the processor-side processor.

5. The serial communication system for memory access of claim 1, wherein:
   the channel establishment phase includes
   transceiving a training sequence acknowledgement packet to each other by means of the processor-side processor and the memory-side processor to complete the configuration of the transmission channel and the transmission lane, after the configuration of the transmission channel number and the transmission lane number is completed.

6. The serial communication system for memory access of claim 1, wherein:
   the flow control initialization phase includes
   performing the flow control initialization by transceiving a flow control initialize packet and a flow control initialize acknowledgement packet to each other by means of the processor-side processor and the memory-side processor.

7. The serial communication system for memory access of claim 6, wherein:
   the performing of the flow control initialization includes
   transmitting a flow control initialize packet representing a state of a payload receiving buffer to the memory-side processor by means of the processor-side processor;
   recording the state of the payload receiving buffer by means of the memory-side processor; and
   transmitting a flow control initialize acknowledgement to the processor-side processor by means of the memory-side processor.

8. The serial communication system for memory access of claim 6, wherein:
   the performing of the flow control initialization includes
   transmitting a flow control initialize packet representing states of a header and a payload receiving buffer to the processor-side processor by means of the memory-side processor;
   recording the states of the header and the payload receiving buffer by means of the processor-side processor; and
   transmitting a flow control initialize acknowledgement to the memory-side processor by means of the processor-side processor.

9. The serial communication system for memory access of claim 1, wherein:
the memory transaction phase includes
transmitting a memory write packet to the memory-side processor by means of the processor-side processor;
transmitting a memory write acknowledgement packet to the processor-side processor by means of the memory-side processor;
performing a memory write transaction for the memory by means of the memory-side processor; and
transmitting a flow control update packet for updating the receiving buffer state of the memory-side processor to the processor-side processor.

10. The serial communication system for memory access of claim 1, wherein:
the memory transaction phase includes
transmitting a memory read packet to the memory-side processor by means of the processor-side processor;
transmitting a memory read acknowledgement packet to the processor-side processor by means of the memory-side processor;
transmitting a flow control update packet for updating the receiving buffer state of the memory-side processor to the processor-side processor;
transmitting a memory read response packet to the processor-side processor by means of the memory-side processor; and
transmitting a flow control update packet for updating the receiving buffer state of the processor-side processor to the memory-side processor.

11. A serial communication method for memory access, the serial communication method comprising the steps of:
receiving a parallel-based memory transaction from a processor;
converting the parallel-based memory transaction into a packet according to a predetermined phase; and
serially transmitting the converted packet through a serial packet signal line,
wherein the predetermined phase includes a channel establishment phase, a flow control initialization phase, and a memory transaction phase,
wherein the channel establishment phase is applied to the flow control initialization phase which is subsequently applied to the memory transaction phase which is subsequently applied to the channel establishment phase when a reset condition is satisfied, and
wherein a type of the converted packet is activated differently according to the channel establishment phase, the flow control initialization phase, and the memory transaction phase.

12. The serial communication method for memory access of claim 11, wherein:
the channel establishment phase includes
receiving a training sequence packet assigned with at least one of a transmission channel number and a transmission lane number through the serial packet signal line;
storing at least one of the transmission channel number and the transmission lane number; and
transmitting a training sequence acknowledgement packet through the serial packet signal line.

13. The serial communication method for memory access of claim 11, wherein:
the flow control initialization phase includes
receiving a flow control initialize packet representing states of a header and a payload receiving buffer through the serial packet signal line;
recording the states of the header and the payload receiving buffer; and
transmitting a flow control initialize acknowledgement through the serial packet signal line.

14. The serial communication method for memory access of claim 11, wherein:
the memory transaction phase includes
transmitting a memory write packet through the serial packet signal line;
receiving a memory write acknowledgement packet through the serial packet signal line; and
receiving a flow control update packet through the serial packet signal line.

15. The serial communication method for memory access of claim 11, wherein:
the memory transaction phase includes
transmitting a memory read packet through the serial packet signal line;
receiving a memory read acknowledgement packet through the serial packet signal line;
receiving a first flow control update packet through the serial packet signal line;
receiving a memory read response packet through the serial packet signal line; and
transmitting a second flow control update packet through the serial packet signal line.

16. A serial communication method for memory access comprising:
receiving a packet serially transmitted through a serial packet signal line according to a predetermined phase;
converting the packet into a parallel-based memory transaction; and
accessing the memory according to the parallel-based memory transaction,
wherein the predetermined phase includes a channel establishment phase, a flow control initialization phase, and a memory transaction phase,
wherein the channel establishment phase is applied to the flow control initialization phase which is subsequently applied to the memory transaction phase which is subsequently applied to the channel establishment phase when a reset condition is satisfied, and
wherein a type of the packet is activated differently according to the channel establishment phase, the flow control initialization phase, and the memory transaction phase.

17. The serial communication method for memory access of claim 16, wherein:
the channel establishment phase includes
transmitting a training sequence packet assigned with at least one of a transmission channel number and a transmission lane number through the serial packet signal line; and
receiving a training sequence acknowledgement packet through the serial packet signal line.

18. The serial communication method for memory access of claim 16, wherein:
the flow control initialization phase includes
receiving a flow control initialize packet representing a state of a payload receiving buffer through the serial packet signal line;
recording the state of the payload receiving buffer; and
transmitting a flow control initialize acknowledgement through the serial packet signal line.

19. The serial communication method for memory access of claim 16, wherein:
the memory transaction phase includes receiving a memory write packet through the serial packet signal line;
transmitting a memory write acknowledgement packet through the serial packet signal line;
performing a memory write transaction for the memory; and
transmitting a flow control update packet through the serial packet signal line.

20. The serial communication method for memory access of claim 16, wherein:
the memory transaction phase includes
receiving a memory read packet through the serial packet signal line;
transmitting a memory read acknowledgement packet through the serial packet signal line;
transmitting a first flow control update packet through the serial packet signal line;
transmitting a memory read response packet through the serial packet signal line; and
receiving a second flow control update packet through the serial packet signal line.

\* \* \* \* \*